E. ALLEN.
Muzzle-Loading Fire-Arms.
No. 461. Patented November 11, 1837.
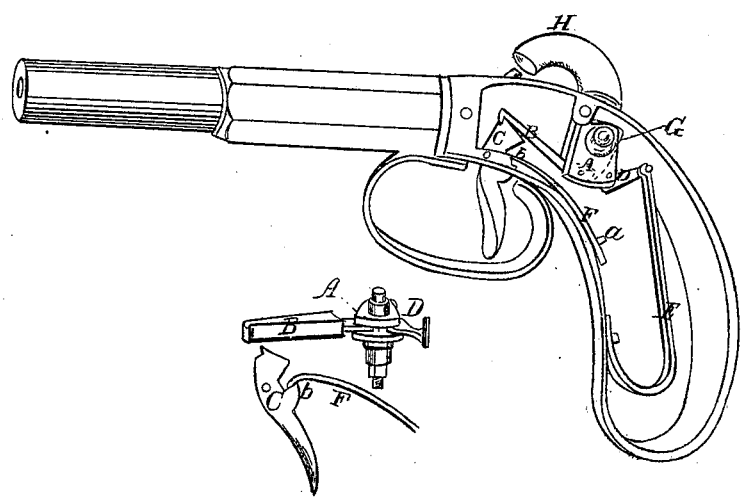

UNITED STATES PATENT OFFICE.

ETHAN ALLEN, OF GRAFTON, MASSACHUSETTS.

IMPROVEMENT IN THE METHOD OF CONSTRUCTING LOCKS FOR FIRE-ARMS.

Specification forming part of Letters Patent No. 461, dated November 11, 1837.

*To all whom it may concern:*

Be it known that I, the undersigned, ETHAN ALLEN, of Grafton, in the county of Worcester and in the State of Massachusetts, have invented a new and useful improvement of a pistol-lock, called "a Lock for a Pistol," by one pulling of the trigger of which it is cocked and the pistol is discharged, of which the following is a full and exact description, viz:

The lock consists of a rolling tumbler, A, (see drawings,) to which, on one side, is attached, by a pin, a dog or catch, B, which has a small lateral projection on its anterior extremity, which hooks over and on the forward side of the upper end of the trigger C. To the other side of the tumbler is attached, by a pin, a stirrup, D, to which is hooked the mainspring E. There is a spring, F, attached to the lower part of the breech, at *a*, and a small spring, G, half coiled round the tumbler in the direction of the dotted line, as seen in the drawings. The axis of the tumbler is prolonged to the outside of the pistol, to which is attached the lock H, which turns with the tumbler.

The following is its mode of operation: Pulling back the trigger brings forward the dog or catch. This, being attached to the lower side of the tumbler below its axis, pulls it forward and the cock rises. When the trigger is pulled back sufficiently far to bring the back part of its upper edge against the dog or catch, the dog or catch is thrown off by it and the tumbler is left free to the action of the mainspring, which, through the medium of the stirrup, brings the tumbler back suddenly, and the cock is sent upon the cone with force sufficient to discharge the piece. The spring F then presses upon the trigger at *b* and brings it back to its position as before a discharge, and the little spring G presses against the end of the dog or catch represented by the dotted lines, presses it upon the trigger, and it is in position for another discharge.

The following are the parts which I claim as my invention, and for which I desire Letters Patent to be granted:

1. The trigger, because it is of a construction entirely new: It differs from the common trigger, inasmuch as it not only discharges the piece but cocks it, and it differs from the slide-trigger, as mine disengages itself from the dog or catch by the projecting part of its upper end, and turns upon a pin, and that slides back till another contrivance throws off the dog or catch.

2. The dog or catch, because it is entirely new in its construction, and because it is so formed and applied that it can be thrown out of action when its aid is no longer necessary, and leaves the tumbler free to the action of the mainspring.

3. The tumbler, which is of entirely new construction, as can be readily perceived by comparing it with the common kind, and because the power on one side—viz., the side to which the dog or catch is applied—is attached to a different part of the tumbler; in the old to the cock which acts on the axis of the tumbler, and in this to a part of the circumference below the axis.

Grafton, 24th day of October, 1837.

ETHAN ALLEN.

Witnesses:
ELEAZER WHEELOCK,
CHARLES W. MARDEN.